(12) United States Patent
Yoo et al.

(10) Patent No.: US 11,915,141 B2
(45) Date of Patent: Feb. 27, 2024

(54) APPARATUS AND METHOD FOR TRAINING DEEP NEURAL NETWORK USING ERROR PROPAGATION, WEIGHT GRADIENT UPDATING, AND FEED-FORWARD PROCESSING

(71) Applicant: Korea Advanced Institute of Science and Technology, Daejeon (KR)

(72) Inventors: Hoi Jun Yoo, Daejeon (KR); Dong Hyeon Han, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 778 days.

(21) Appl. No.: 16/988,737

(22) Filed: Aug. 10, 2020

(65) Prior Publication Data
US 2021/0056427 A1    Feb. 25, 2021

(30) Foreign Application Priority Data
Aug. 20, 2019   (KR) ......................... 10-2019-0101984

(51) Int. Cl.
*G06N 3/08*    (2023.01)
*G06N 3/084*   (2023.01)
*G06N 5/046*   (2023.01)

(52) U.S. Cl.
CPC .............. *G06N 3/084* (2013.01); *G06N 5/046* (2013.01)

(58) Field of Classification Search
CPC ........ G06N 3/084; G06N 5/046; G06N 3/047; G06N 3/063
See application file for complete search history.

(56) References Cited

FOREIGN PATENT DOCUMENTS

KR    10-2015-0016089 A    2/2015
KR    10-2019-0014829 A    2/2019

OTHER PUBLICATIONS

Nokland, "Direct Feedback Alignment Provides Learning in Deep Neural Networks", Dec. 21, 2016, 30th Conference on Neural Information Processing Systems (NIPS 2016), pp. 1-9 (Year: 2016).*
Luo et al., "Parameter Hub: a Rack-Scale Parameter Server for Distributed Deep Neural Network Training", May 21, 2018, arXiv: 1805.07891v1, pp. 1-15 (Year: 2018).*

* cited by examiner

*Primary Examiner* — Brent Johnston Hoover
(74) *Attorney, Agent, or Firm* — Revolution IP, PLLC

(57) ABSTRACT

Disclosed herein are an apparatus and method for training a deep neural network. An apparatus for training a deep neural network including N layers, each having multiple neurons, includes an error propagation processing unit configured to, when an error occurs in an N-th layer in response to initiation of training of the deep neural network, determine an error propagation value for an arbitrary layer based on the error occurring in the N-th layer and directly propagate the error propagation value to the arbitrary layer, a weight gradient update processing unit configured to update a forward weight for the arbitrary layer based on a feed-forward value input to the arbitrary layer and the error propagation value in response to the error propagation value, and a feed-forward processing unit configured to, when update of the forward weight is completed, perform a feed-forward operation in the arbitrary layer using the forward weight.

22 Claims, 16 Drawing Sheets

[FIG.1A]
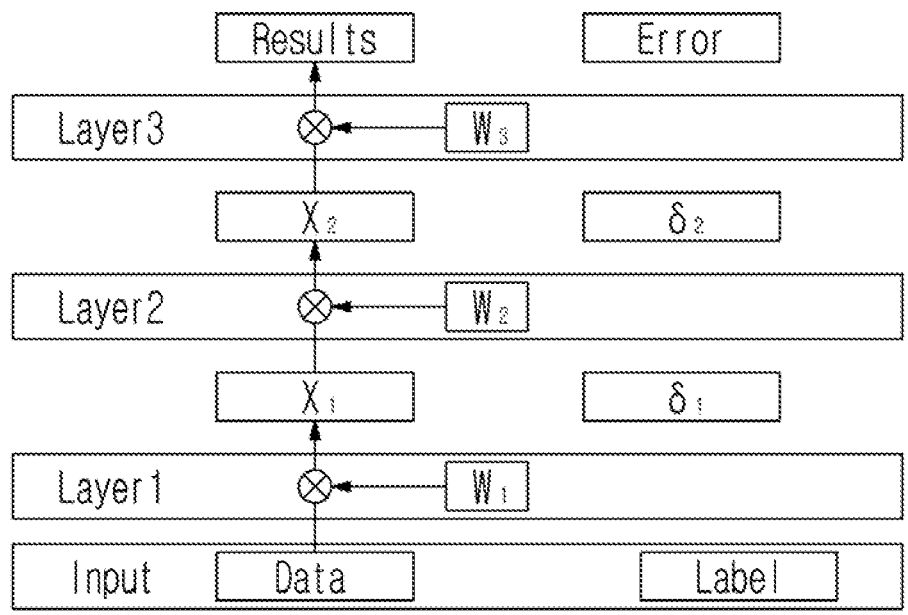
[FIG.1B]
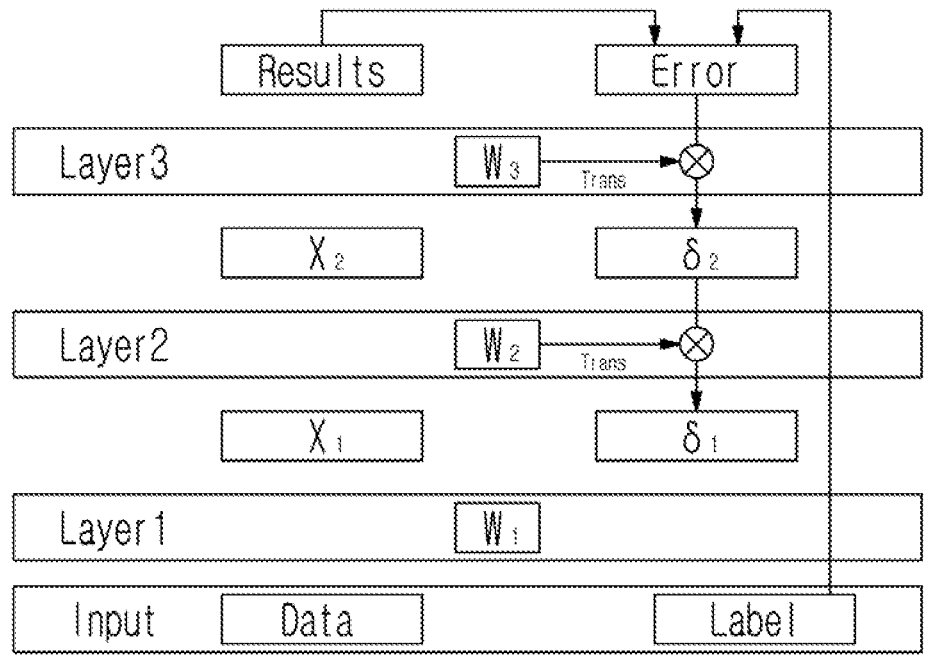

[FIG.1C]
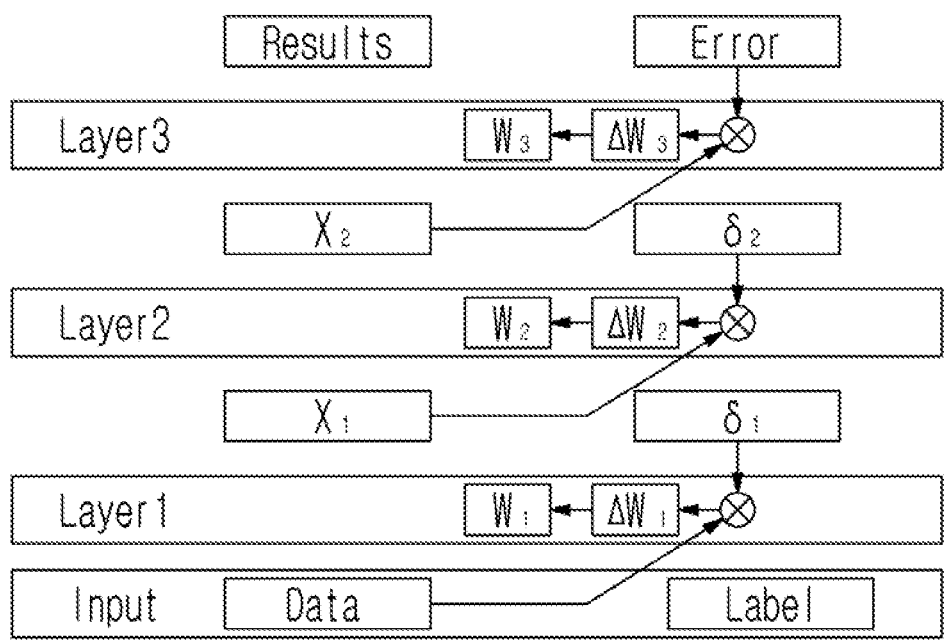

[FIG.2]
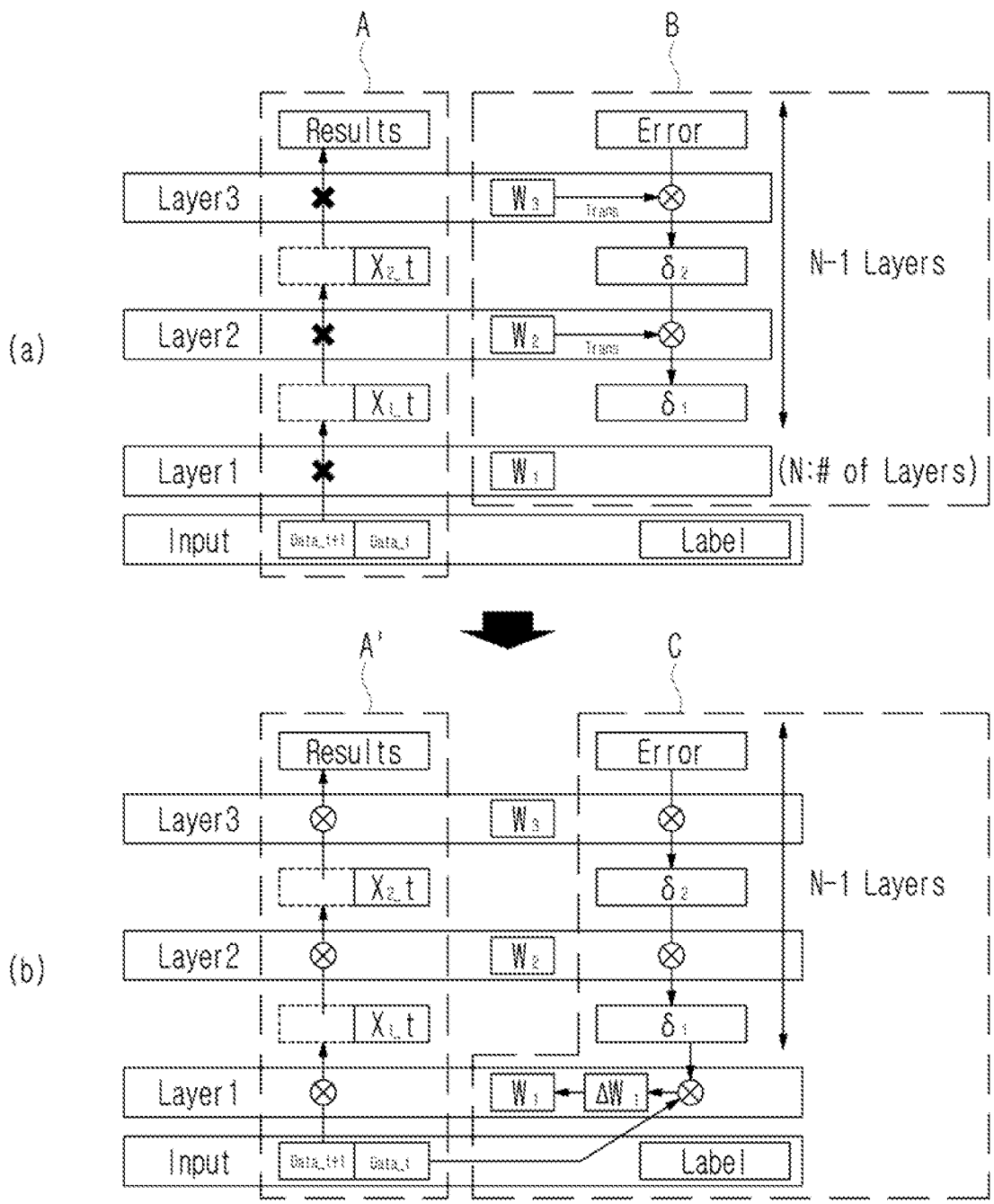

[FIG.3]
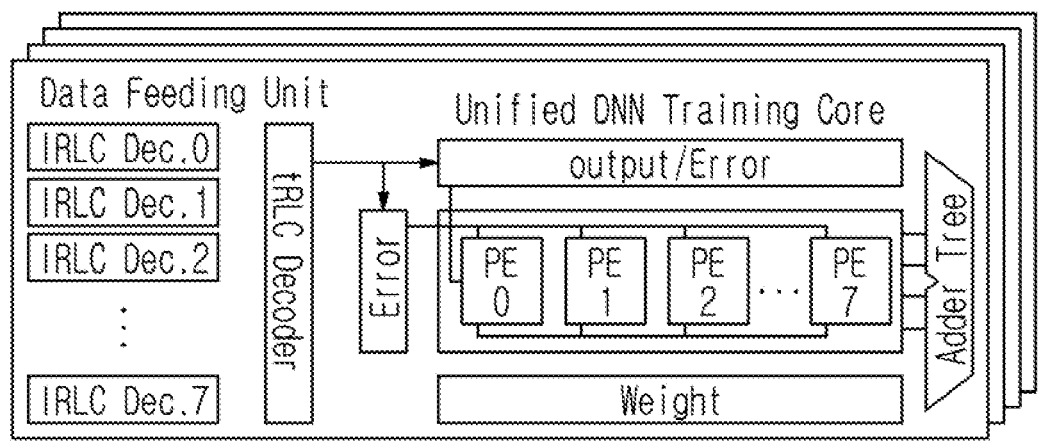
[FIG.4]
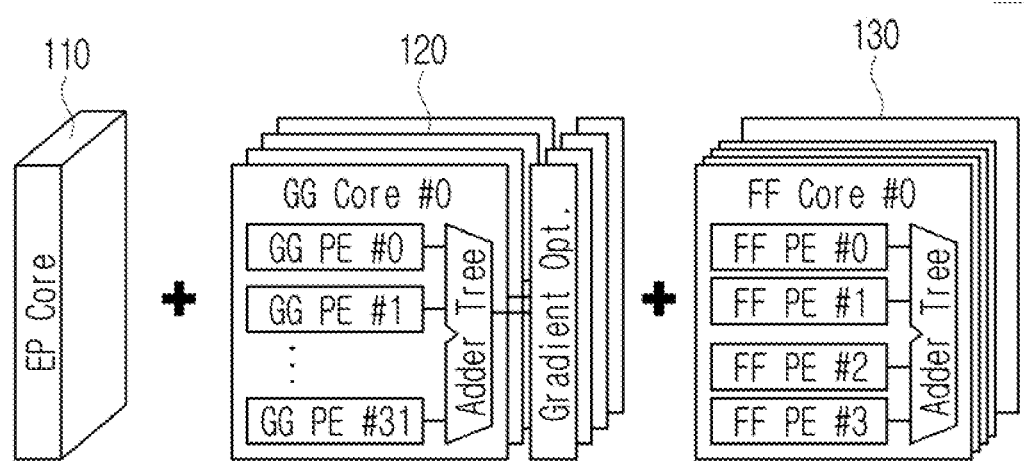

[FIG.5]
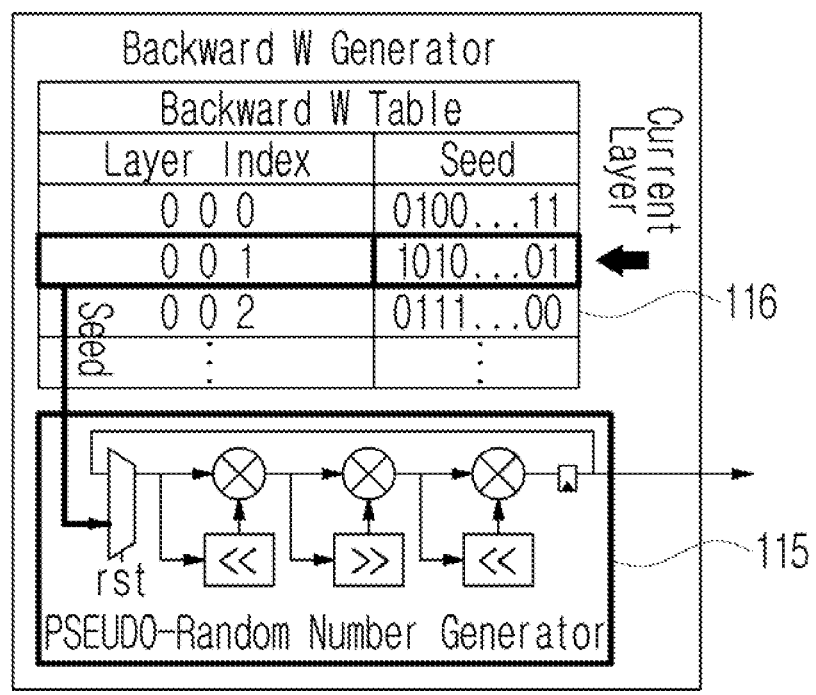

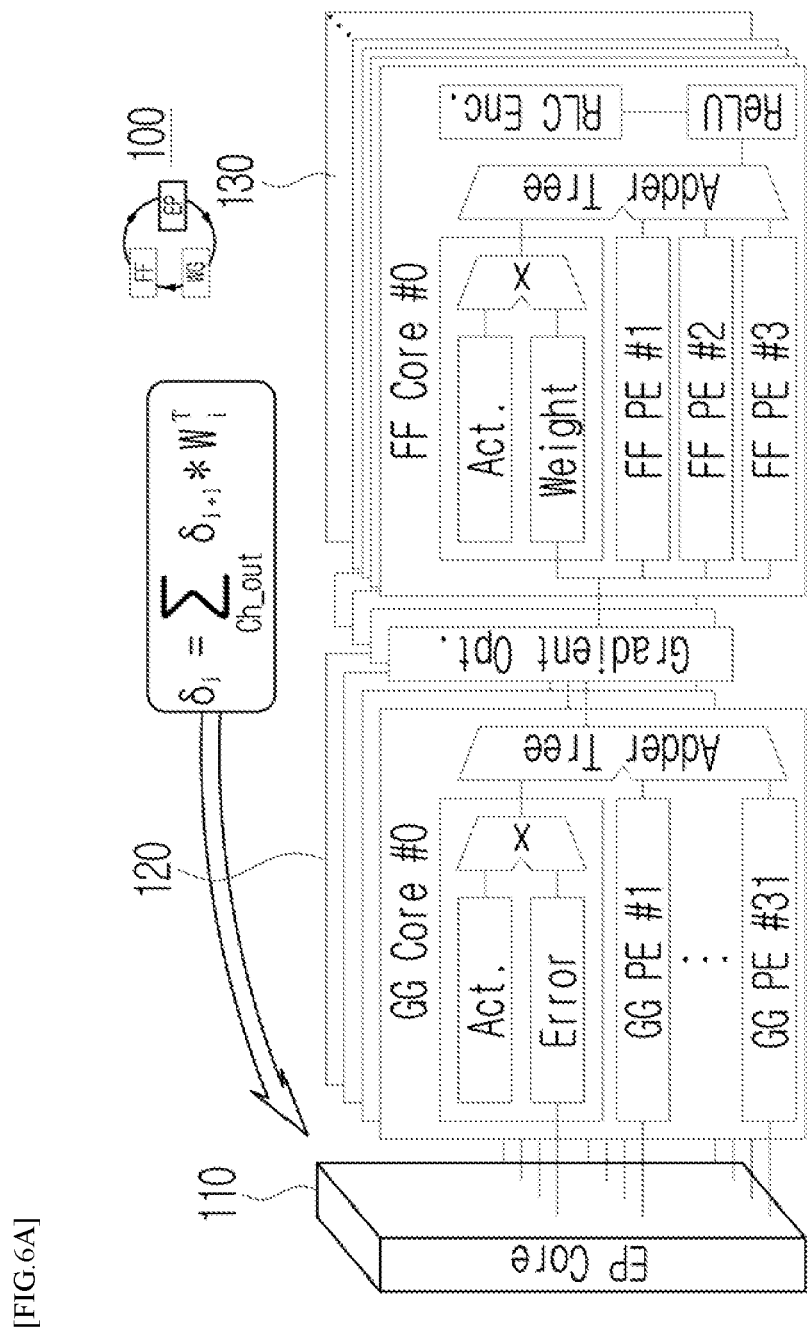
[FIG.6A]

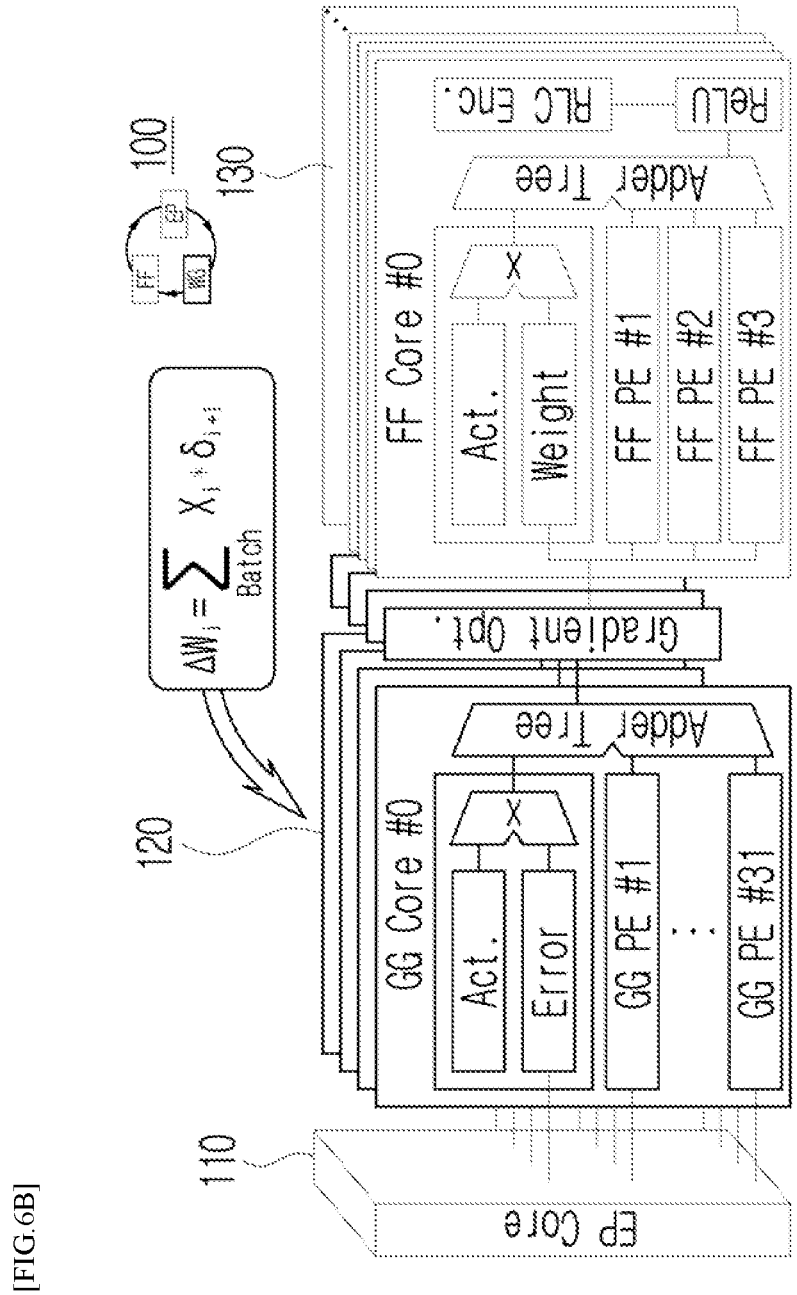
[FIG.6B]

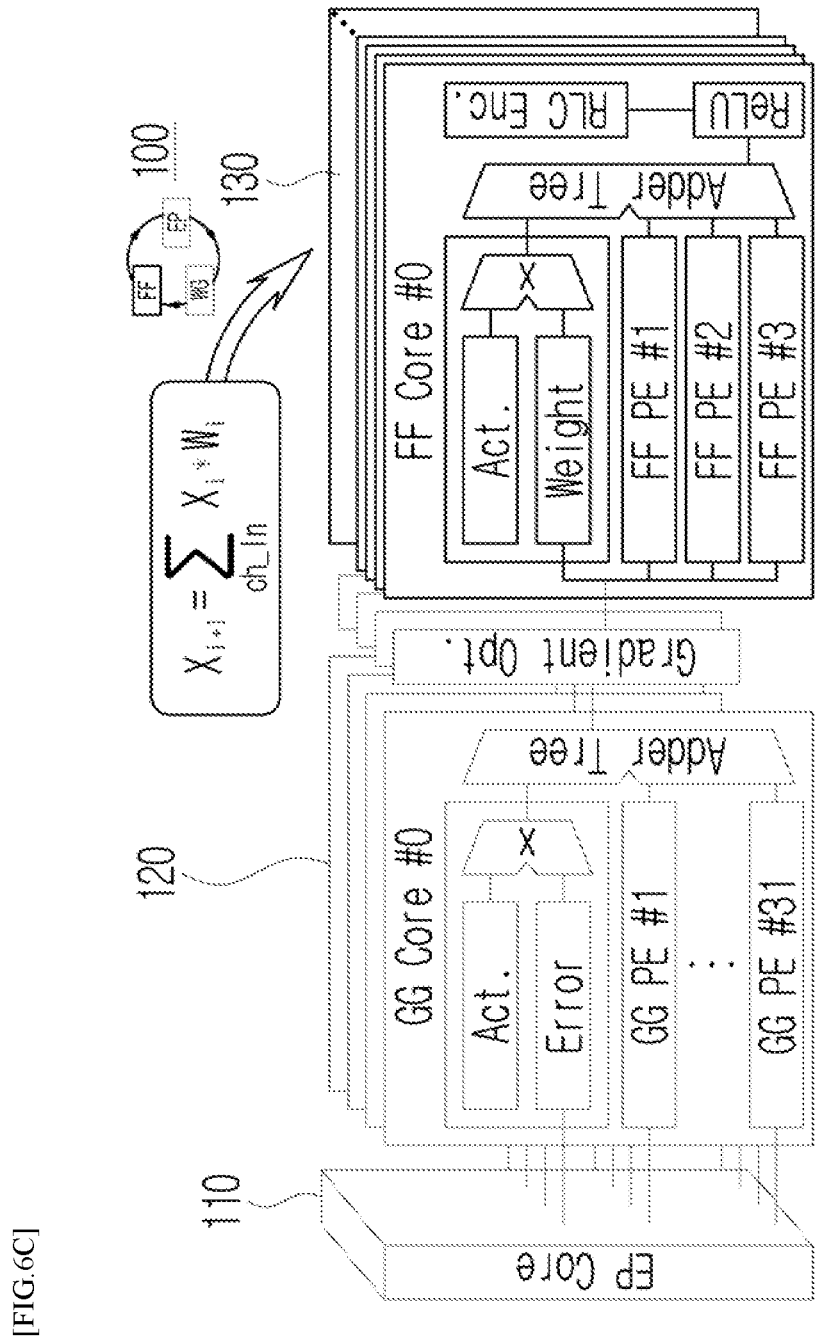
[FIG.6C]

[FIG.8A]
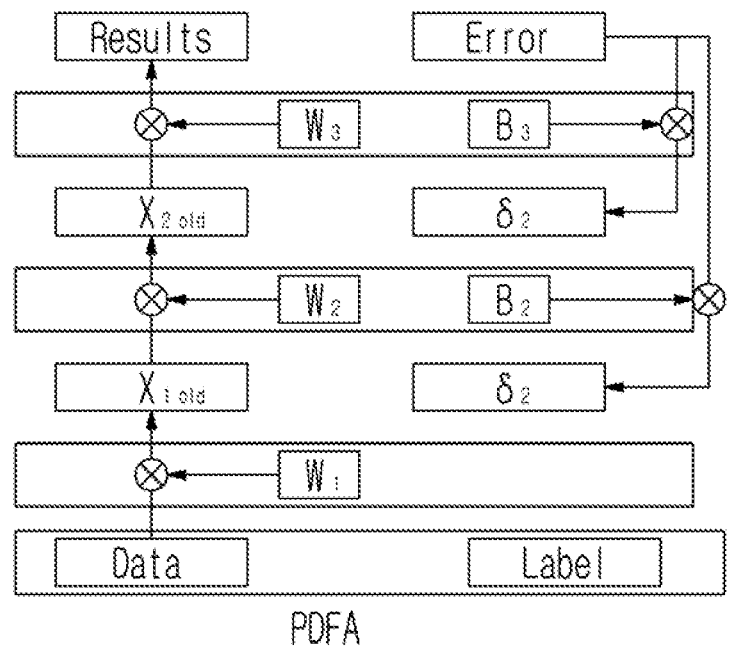

FIG. 8B
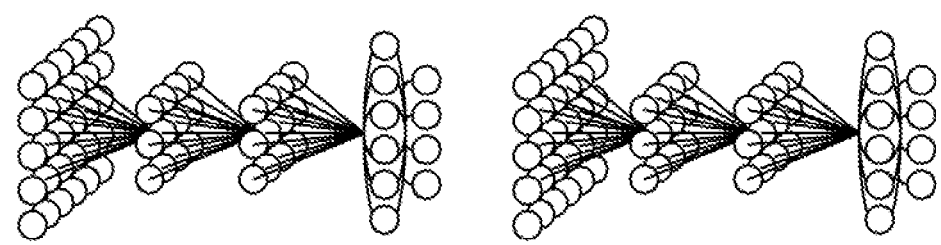
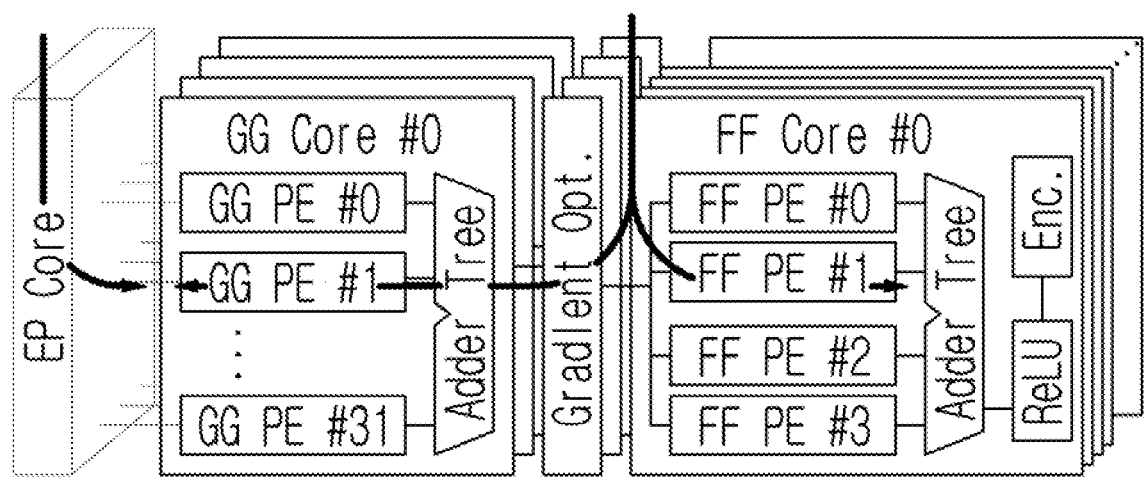

[FIG.9]
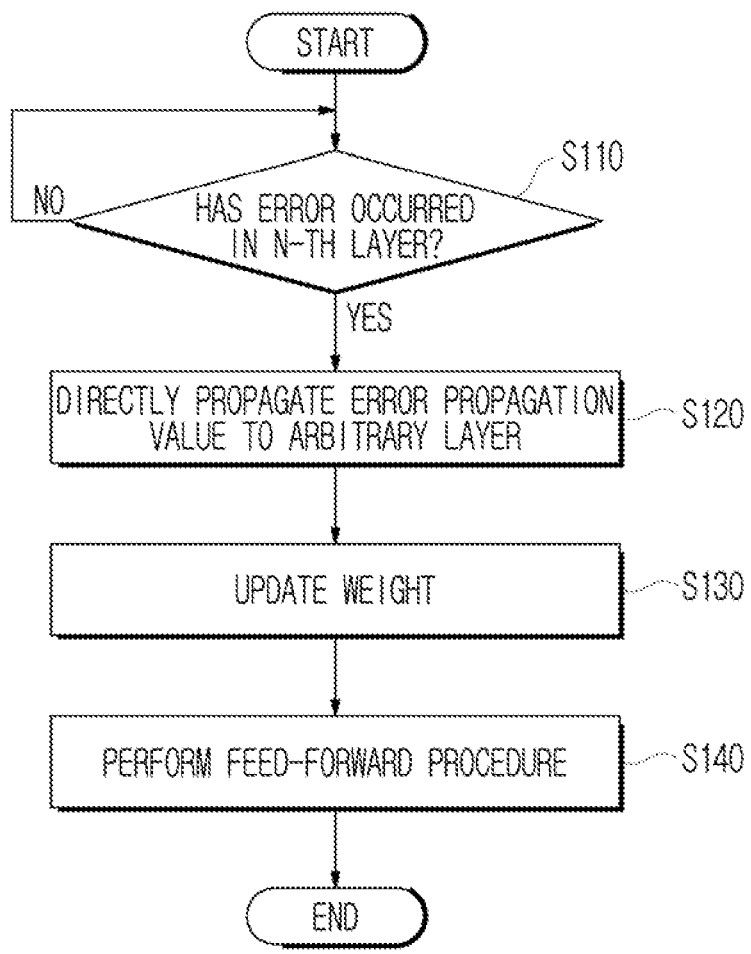

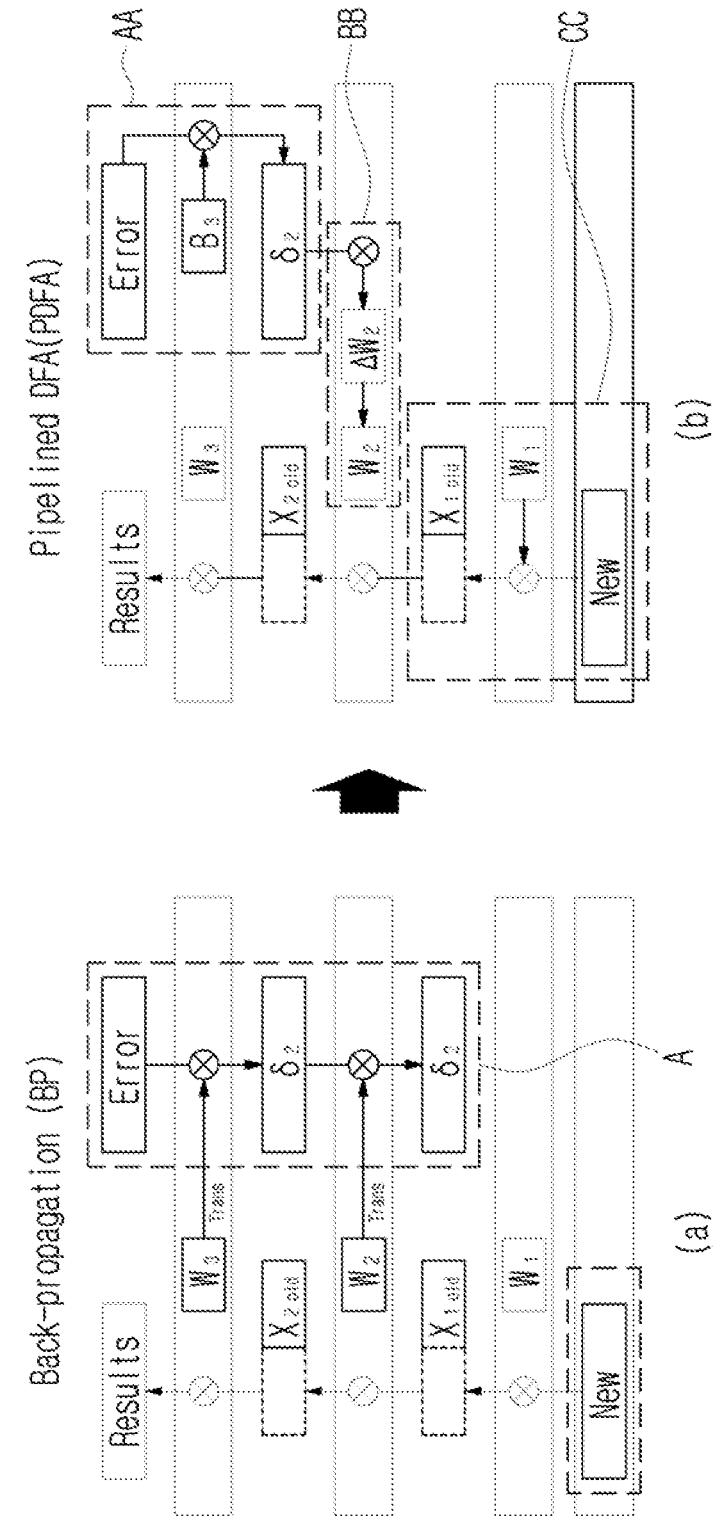
[FIG.10]

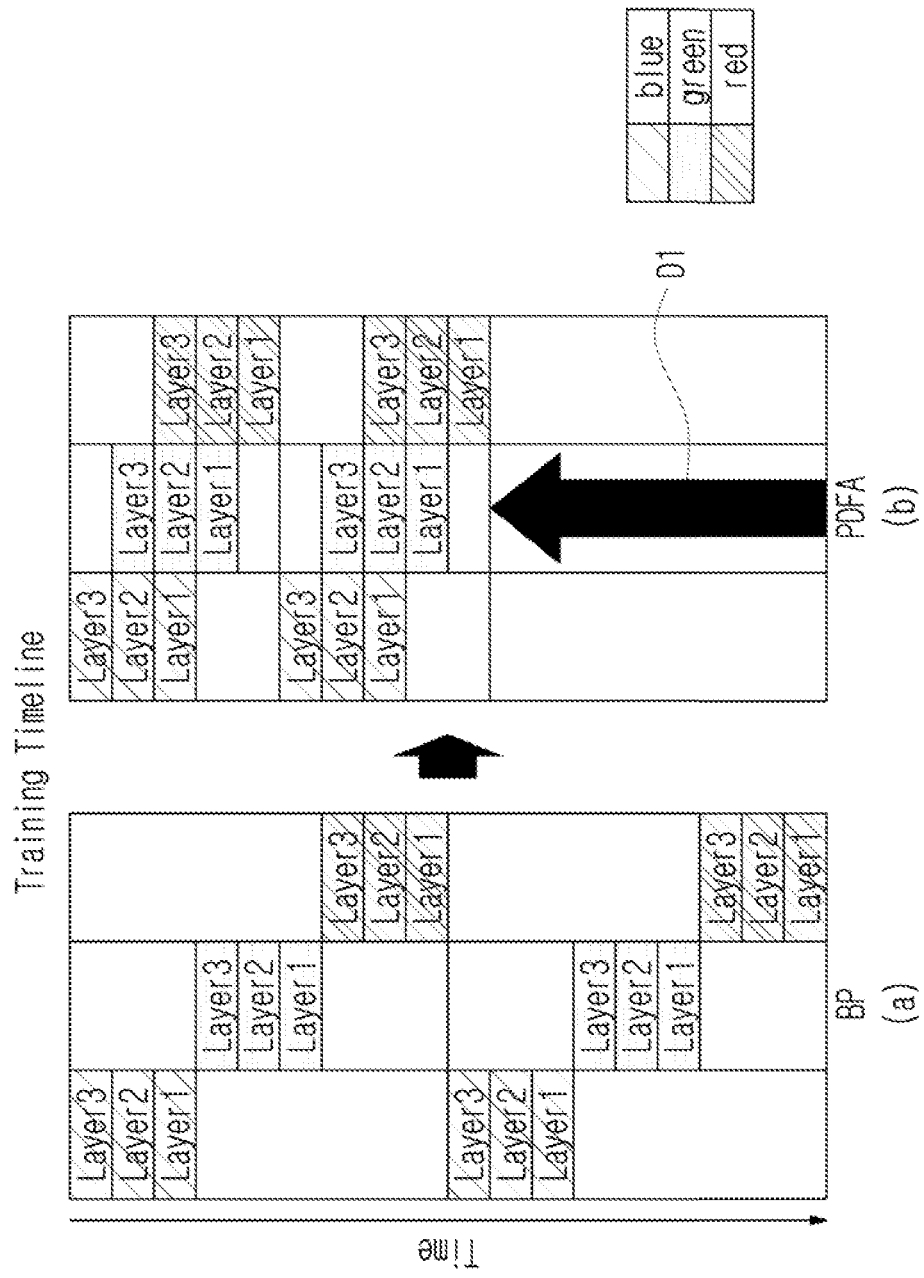
[FIG.11]

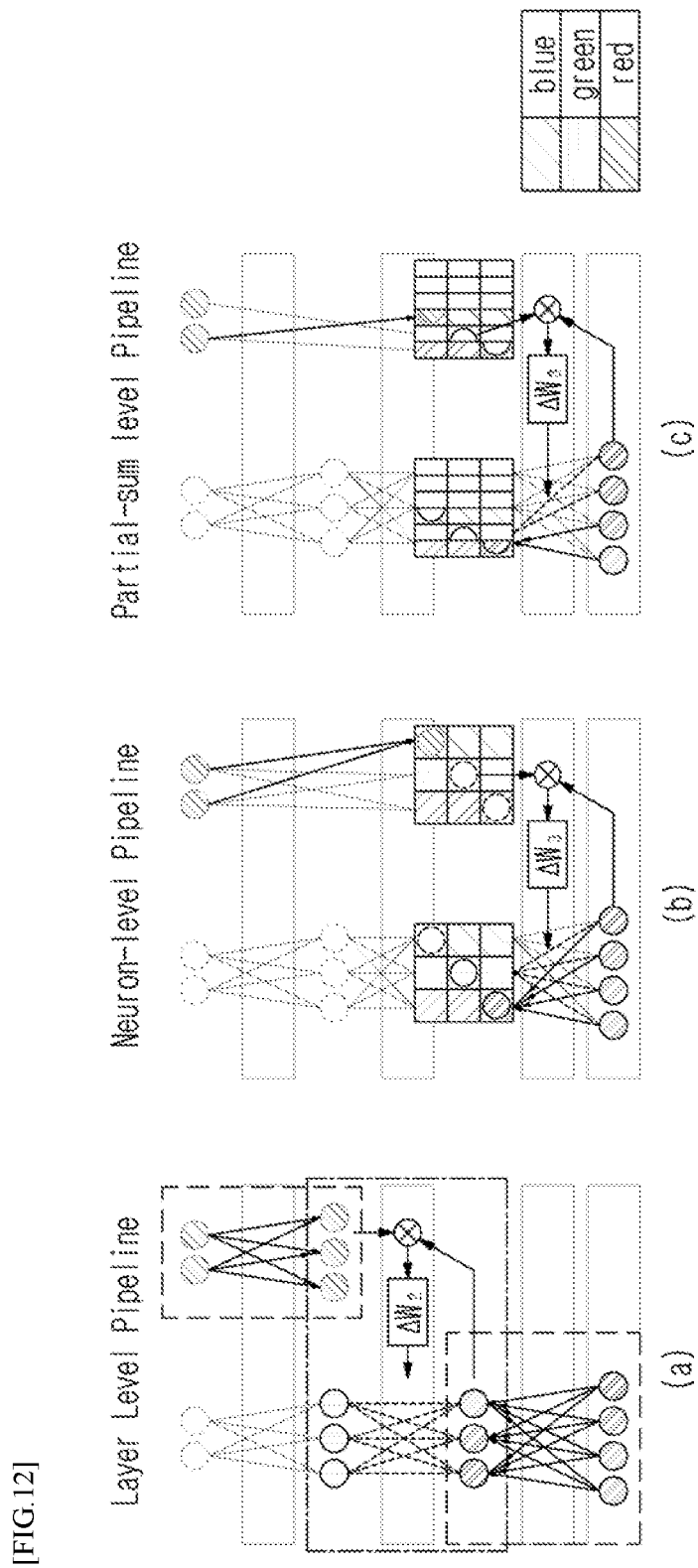
[FIG.12]

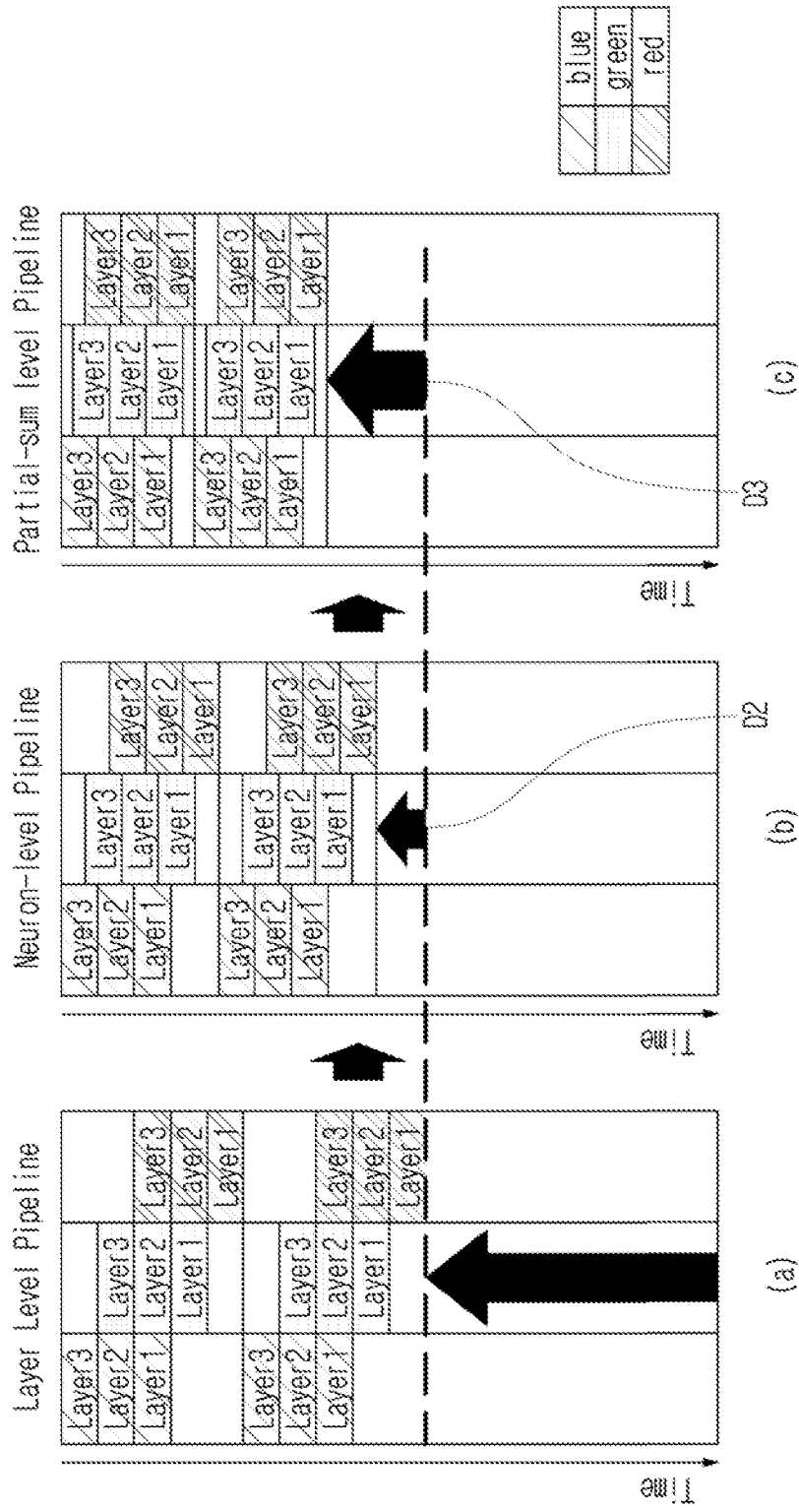
[FIG.13]

APPARATUS AND METHOD FOR TRAINING DEEP NEURAL NETWORK USING ERROR PROPAGATION, WEIGHT GRADIENT UPDATING, AND FEED-FORWARD PROCESSING

CROSS REFERENCE TO RELATED APPLICATION(S)

This application claims the benefit of Korean Patent Application No. 10-2019-0101984, filed on Aug. 20, 2019, which is hereby incorporated by reference in its entirety into this application.

BACKGROUND OF THE INVENTION

1. Technical Field

The present invention relates generally to an apparatus and method for training a deep neural network, and more particularly to an apparatus and method for training a deep neural network which can reduce power consumption and increase a learning speed.

2. Description of the Related Art

Recently, a deep neural network (hereinafter referred to as a "DNN"), which is one of machine-learning technologies, has been widely utilized in various fields, such as voice recognition and image analysis. In particular, a convolutional neural network (hereinafter referred to as a "CNN"), which is one type of DNN, is used in object recognition, image segmentation, etc., and exhibits performance much higher than that of an existing handcrafted computer vision algorithm. A CNN is divided into a convolutional layer, which extracts the feature points of an image, and a fully connected layer, which is a classifier. Generally, the convolutional layer is arranged in the header (first) stage of a DNN, and the fully connected layer is arranged in a tail (last) stage of the DNN.

Typically, in a CNN, there are many cases where a network trained through a large number of data sets is used only for an inference (feed-forward) path. However, in the case where the type or number of objects to be recognized is changed, there is a need to retrain the DNN when the environment in which the DNN is used is changed.

DNN training is performed using a representative algorithm, that is, a back-propagation (BP) algorithm. The reason for this is that the back-propagation (BP) algorithm may rapidly train even a complicated deep neural network, and to date has been the most commonly used training method in deep-learning fields.

Such a back-propagation (BP) method includes a feed-forward (FF) procedure, an error propagation (EP) procedure, and a weight gradient update (WG) procedure. FIGS. 1A to 1C are diagrams schematizing and illustrating a conventional back-propagation (BP) method, wherein FIG. 1A illustrates a feed-forward (FF) procedure, FIG. 1B illustrates an error propagation (EP) procedure, and FIG. 1C illustrates a weight gradient update (WG) procedure. Here, in FIGS. 1A to 1C, the case where a training layer is composed of three layers, that is, Layer 1, Layer 2, and Layer 3, is described by way of example.

Referring to FIGS. 1A to 1C, DNN training is performed as follows. In the feed-forward (FF) procedure (1A), a dataset, the label of which is already present, is inferred (feed-forward) from a DNN, and then feed-forward results are derived. In the error propagation procedure (EP) (1B), the feed-forward results are compared with the label so as to determine errors, and the errors are propagated from a subsequent layer (Layer 3) to a previous layer (Layer 2). In the weight gradient update (WG) procedure (1C), the weights $W_1$, $W_2$, and $W_3$ assigned to respective layers are changed.

The back-propagation (BP) method, such as that exemplified in FIGS. 1A to 1C, must memorize all of intermediate feed-forward results $X_1$ and $X_2$ and the propagated errors $\delta_1$ and $\delta_2$ so as to minimize a computational workload when performing error propagation (EP) (1B) and weight gradient update (WG) (1C). Due thereto, a large memory capacity and a wide bandwidth are required, thus causing problems such as a low learning speed and high power consumption. In particular, these problems may be more predominant in neural networks (e.g., a fully connected layer, a recurrent neural network, etc.) in which the number of memory accesses for the same computational workload is large.

In this way, the large number of accesses occurring due to the fundamental limitation of the back-propagation algorithm makes it difficult to perform on-chip learning due to the insufficient memory band of a mobile device, high power consumption, etc. Also, when the retraining of a deep neural network is required in real time, the large number of memory accesses may become a major factor that decreases the learning speed of a deep neural network and increases power consumption. Meanwhile, in the situation in which respective users utilize DNN in different environments, training based on a server is problematic in that it can greatly violate the privacy of the users. Therefore, DNN training in a mobile device is necessarily required, and for this operation, required are a DNN training apparatus and method that reduce power consumption and improve a learning speed.

Also, since the back-propagation (BP) method, such as that exemplified in FIGS. 1A to 1C, sequentially propagates errors occurring in the feed-forward (FF) procedure from the last layer (Layer 3) to the previous layer (Layer 2), it is characterized in that, in order to update weights, it is necessary to wait until the termination of the entire error propagation (EP) procedure. For example, when the total number of layers to be trained is 'N', updating weights is possible only after error propagation for a total of 'N−1' layers is completed. FIG. 2 is a diagram illustrating the problem with the conventional back propagation (BP) method, and shows an example of the case in which the total number of layers to be trained is 3. In detail, (a) in FIG. 2 illustrates the case where a feed-forward (FF) procedure A is stopped while an error propagation (EP) procedure B is being performed, and (b) in FIG. 2 illustrates the case where a feed-forward (FF) procedure A' is performed in a first layer while a weight gradient update (WG) procedure C is being performed. Referring to FIG. 2, it can be seen that, when a weight does not reach the previous layer, it is difficult to start a weight gradient update procedure and a subsequent feed-forward procedure. In this case, the three training procedures, namely feed-forward (FF), error propagation (EP), and weight gradient update (WG), cannot be performed in parallel, thus resulting in a decrease in learning speed.

This problem of decreased learning speed makes it difficult to retrain a network faster in accordance with the environment in which the appearance of an object, the brightness of a surrounding lighting device, or the like changes quickly, as in the case of object tracking or the like. Therefore, in order for an application requiring fast retraining (e.g., an object-tracking application or the like) to utilize a DNN, a method for training the DNN at high speed is required.

Meanwhile, FIG. 3 is a diagram illustrating an example of a conventional neural network training (learning) processor. Referring to FIG. 3, all conventional neural network training processors 10 adopt a homogeneous core architecture so as to accelerate a back propagation (BP) algorithm. Generally, since there is no case where the back propagation (BP) algorithm processes three types of training procedures in parallel, it may be considered that it is important to process individual training procedures in parallel as quickly as possible. Therefore, in the conventional technology, desired performance may be realized using neural network training processors 10 such as those exemplified in FIG. 3. However, as the memory bandwidth required for parallel processing has increased in a fully connected layer or a recurrent neural network, the design of a homogeneous core architecture in mobile devices results in a limit on a learning speed. In addition, since a data path required in order to support all of three different training procedures is complicated, a problem arises in that area and energy efficiency is deteriorated compared to existing hardware designed only for a feed-forward procedure.

PRIOR ART DOCUMENTS

Patent Documents (Patent Document 1) Korean Patent Application Publication No. 10-2019-14829

SUMMARY OF THE INVENTION

Accordingly, the present invention has been made keeping in mind the above problems occurring in the prior art, and an object of the present invention is to provide an apparatus and method for training a deep neural network, which reduce power consumption and improve a learning speed by reducing the number of external memory accesses using a random number generator, particularly a pseudo random number generator.

Another object of the present invention is to provide an apparatus and method for training a deep neural network, which reduce power consumption and improve a learning speed, thus enabling on-chip learning and real-time retraining.

A further object of the present invention is to provide an apparatus and method for training a deep neural network, which are operable in a mobile device.

Yet another object of the present invention is to provide an apparatus and method for training a deep neural network, which reduce power consumption and improve a learning speed by utilizing a Pipelined Direct Feedback Alignment (PDFA) algorithm, which is an application of a Direct Feedback Alignment (DFA) algorithm.

Still another object of the present invention is to provide an apparatus and method for training a deep neural network, which enable fast network training to be performed, thus allowing an application requiring fast retraining (e.g., an object-tracking application or the like) to utilize a DNN.

Still another object of the present invention is to provide an apparatus for training a deep neural network, which improve area and energy efficiency by utilizing a heterogeneous core architecture.

In accordance with an aspect of the present invention to accomplish the above objects, there is provided an apparatus for training a deep neural network including N layers, each having multiple neurons, the apparatus including an error propagation processing unit configured to, when an error occurs in an N-th layer in response to initiation of training of the deep neural network, determine an error propagation value for an arbitrary layer based on the error occurring in the N-th layer and then directly propagate the error propagation value to the arbitrary layer; a weight gradient update processing unit configured to update a forward weight (W) for the arbitrary layer based on both a feed-forward value input to the arbitrary layer and the error propagation value in response to transfer of the error propagation value; and a feed-forward processing unit configured to, when update of the forward weight (W) is completed, perform a feed-forward operation in the arbitrary layer using the forward weight (W), wherein the apparatus is configured such that each of the error propagation processing unit, the weight gradient update processing unit, and the feed-forward processing unit is configured in a pipelined structure, and the error propagation processing unit, the weight gradient update processing unit, and the feed-forward processing unit overlap each other to operate in parallel with each other in units of a predetermined processing time.

In an embodiment, the error propagation processing unit, the weight gradient update processing unit, and the feed-forward processing unit may be implemented in a heterogeneous core architecture to be independently operable and controllable.

In an embodiment, the error propagation processing unit, the weight gradient update processing unit, and the feed-forward processing unit may overlap each other to operate in parallel with each other in units of a time during which individual layers constituting the deep neural network are processed.

In an embodiment, the error propagation processing unit, the weight gradient update processing unit, and the feed-forward processing unit may overlap each other to operate in parallel with each other in units of a time during which individual neurons forming each layer are processed.

In an embodiment, the error propagation processing unit, the weight gradient update processing unit, and the feed-forward processing unit may overlap each other to operate in parallel with each other in units of a time that is required in order to update one forward weight.

In an embodiment, the error propagation processing unit, the weight gradient update processing unit, and the feed-forward processing unit may overlap each other to operate in parallel with each other in units of a time that is required in order to perform part of computations required in order to update one forward weight.

In an embodiment, the error propagation processing unit may include a random number generator configured to generate fixed random numbers for N respective layers, and the error propagation processing unit may determine an error propagation value for each layer by multiplying the error occurring in the N-th layer by a corresponding random number generated by the random number generator, and thereafter set the corresponding random number generated by the random number generator as a backward weight (B) and directly propagate the error propagation value to a corresponding layer.

In an embodiment, the random number generator may include a table in which random seeds set differently for N respective layers are stored, and the random number generator may be configured to, whenever the error for the arbitrary layer is propagated, generate a random number based on a random seed that corresponds to the arbitrary layer and that is read from the table.

In an embodiment, the error propagation processing unit may be configured to, when the error occurs in the N-th layer in response to initiation of training of the deep neural network, determine an error propagation value for a first layer to be a first error propagation value based on the error occurring in the N-th layer and then directly propagate the first error propagation value to the first layer, the weight gradient update processing unit may be configured to update a forward weight ($W_1$) for the first layer based on both a feed-forward value input to the first layer and the first error propagation value in response to transfer of the first error propagation value, and the feed-forward processing unit may be configured to, when update of the forward weight ($W_1$) is completed, perform a feed-forward operation on a new input value in the first layer using the forward weight ($W_1$).

In an embodiment, the error propagation processing unit may be configured to, while the weight gradient update processing unit performs an operation of updating the forward weight ($W_1$) for the first layer, perform an operation of determining an error propagation value for a second layer to be a second error propagation value based on the error occurring in the N-th layer and then directly propagating the second error propagation value to the second layer in parallel with the update operation.

In an embodiment, the weight gradient update processing unit may be configured to, while the feed-forward processing unit performs the feed-forward operation in the first layer, perform an operation of updating a forward weight ($W_2$) for the second layer based on both a feed-forward value input to the second layer and the second error propagation value in response to transfer of the second error propagation value in parallel with the feed-forward operation.

In an embodiment, the error propagation processing unit may be configured to, while the feed-forward processing unit performs the feed-forward operation in the first layer, perform an operation of determining an error propagation value for a third layer to be a third error propagation value based on the error occurring in the N-th layer and then directly propagating the third error propagation value to the third layer in parallel with the feed-forward operation.

In accordance with another aspect of the present invention to accomplish the above objects, there is provided a method for training a deep neural network including N layers, each having multiple neurons, the method including performing an error propagation procedure configured to, when an error occurs in an N-th layer in response to initiation of training of the deep neural network, determine an error propagation value for an arbitrary layer based on the error occurring in the N-th layer and then directly propagate the error propagation value to the arbitrary layer; performing a weight gradient update procedure configured to update a forward weight (W) for the arbitrary layer based on both a feed-forward value input to the arbitrary layer and the error propagation value in response to transfer of the error propagation value; and performing a feed-forward procedure configured to, when update of the forward weight (W) is completed, perform a feed-forward operation in the arbitrary layer using the forward weight (W), wherein the error propagation procedure, the weight gradient update procedure, and the feed-forward procedure overlap each other to be performed in parallel with each other in units of a predetermined processing time.

In an embodiment, the error propagation procedure, the weight gradient update procedure, and the feed-forward procedure may overlap each other to be performed in parallel with each other in units of a time during which individual layers constituting the deep neural network are processed.

In an embodiment, the error propagation procedure, the weight gradient update procedure, and the feed-forward procedure may overlap each other to be performed in parallel with each other in units of a time during which individual neurons forming each layer are processed.

In an embodiment, the error propagation procedure, the weight gradient update procedure, and the feed-forward procedure may overlap each other to be performed in parallel with each other in units of a time that is required in order to update one forward weight.

In an embodiment, the error propagation procedure, the weight gradient update procedure, and the feed-forward procedure may overlap each other to be performed in parallel with each other in units of a time that is required in order to perform part of computations required in order to update one forward weight.

In an embodiment, the error propagation procedure may include a random number generation procedure of generating fixed random numbers for N respective layers, and the error propagation procedure may be configured to determine an error propagation value for each layer by multiplying the error occurring in the N-th layer by a corresponding random number generated in the random number generation procedure, and thereafter set the corresponding random number generated in the random number generation procedure as a backward weight (B) and directly propagate the error propagation value to a corresponding layer.

In an embodiment, the random number generation procedure may include a random seed storage procedure of differently setting random seeds for N respective layers and storing the random seeds in a form of a table, and the random number generation procedure may be configured to, whenever the error for the arbitrary layer is propagated, generate a random number based on a random seed corresponding to the arbitrary layer.

In an embodiment, the error propagation procedure may be configured to, when the error occurs in the N-th layer in response to initiation of training of the deep neural network, determine an error propagation value for a first layer to be a first error propagation value based on the error occurring in the N-th layer and then directly propagate the first error propagation value to the first layer, the weight gradient update procedure may be configured to update a forward weight ($W_1$) for the first layer based on both a feed-forward value input to the first layer and the first error propagation value in response to transfer of the first error propagation value, and the feed-forward procedure may be configured to, when update of the forward weight ($W_1$) is completed, perform a feed-forward operation on a new input value in the first layer using the forward weight ($W_1$).

In an embodiment, the error propagation procedure may be configured to, while an operation of updating the forward weight ($W_1$) for the first layer is performed in the weight gradient update procedure, perform an operation of determining an error propagation value for a second layer to be a second error propagation value based on the error occurring in the N-th layer and then directly propagating the second error propagation value to the second layer in parallel with the update operation.

In an embodiment, the weight gradient update procedure may be configured to, while the feed-forward operation in the first layer is performed in the feed-forward procedure, perform an operation of updating a forward weight ($W_2$) for the second layer based on both a feed-forward value input to the second layer and the second error propagation value in response to transfer of the second error propagation value in parallel with the feed-forward operation.

In an embodiment, the error propagation procedure may be configured to, while the feed-forward operation in the first layer is performed in the feed-forward procedure, perform an operation of determining an error propagation value for a third layer to be a third error propagation value based on the error occurring in the N-th layer and then directly propagating the third error propagation value to the third layer in parallel with the feed-forward operation.

BRIEF DESCRIPTION OF THE DRAWINGS

The above and other objects, features and advantages of the present invention will be more clearly understood from the following detailed description taken in conjunction with the accompanying drawings, in which:

FIGS. 1A to 1C are diagrams schematizing and explaining a conventional back-propagation (BP) method;

FIG. 2 is a diagram for explaining the problem with a conventional back-propagation method;

FIG. 3 is a diagram illustrating an example of a conventional neural network training processor;

FIG. 4 is a schematic block diagram illustrating an apparatus for training a deep neural network according to an embodiment of the present invention;

FIG. 5 is a schematic block diagram of a random number generator for generating a backward weight B according to an embodiment of the present invention;

FIGS. 6A to 6C are diagrams illustrating examples of operation of an apparatus for training a deep neural network according to an embodiment of the present invention;

FIGS. 8A and 8B are diagrams for explaining access to external memory by the apparatus for training a deep neural network according to an embodiment of the present invention;

FIG. 9 is a processing flowchart of a method for training a deep neural network according to an embodiment of the present invention;

FIG. 10 is a diagram for explaining a comparison between the method for training a deep neural network according to the embodiment of the present invention and a conventional method;

FIG. 11 is a diagram illustrating a comparison between a training time required by the method for training a deep neural network according to the embodiment of the present invention and a training time required by the conventional method;

FIG. 12 is a diagram for explaining a comparison between methods for training a deep neural network according to other embodiments of the present invention; and FIG. 13 is a diagram illustrating a comparison between training times required by the methods for training a deep neural network according to other embodiments of the present invention.

DESCRIPTION OF THE PREFERRED EMBODIMENTS

Figure 7A:
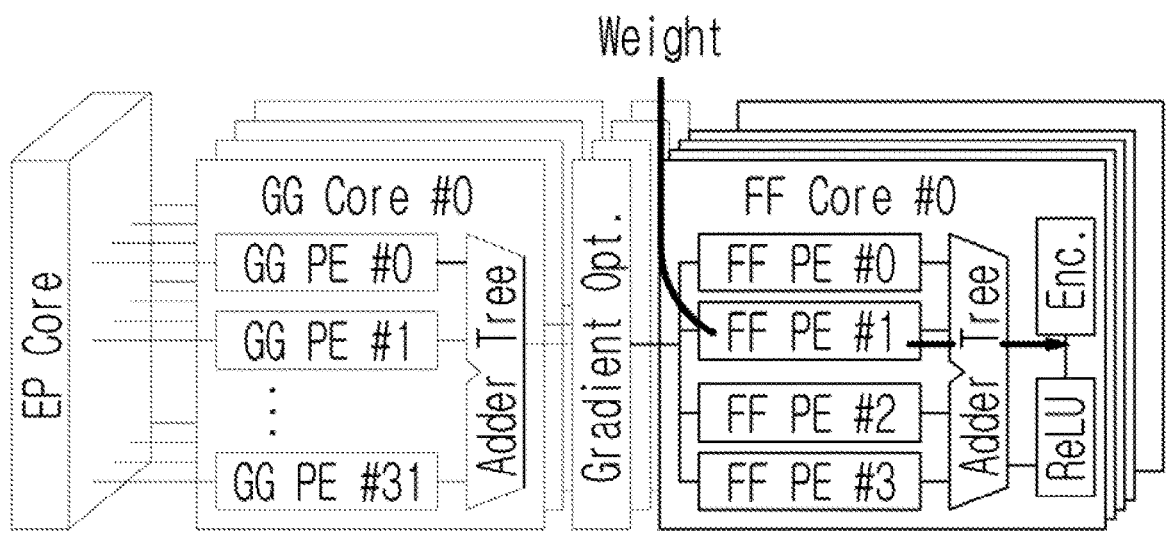
FIGS. 7A and 7B are diagrams for explaining the cause of an increase in energy efficiency of an apparatus for training a deep neural network according to an embodiment of the present invention.

Hereinafter, embodiments of the present invention will be described in detail with reference to the attached drawings.

The present invention will be described in detail such that those skilled in the art to which the present invention pertains can easily practice the present invention. The present invention may be embodied in various different forms, without being limited to the following embodiments. Meanwhile, in the drawings, parts irrelevant to the description of the invention will be omitted so as to clearly describe the present invention. It should be noted that the same or similar reference numerals are used to designate the same or similar components throughout the drawings. Descriptions of known configurations which allow those skilled in the art to easily understand the configurations will be omitted below.

In the specification and the accompanying claims, when a certain element is referred to as "comprising" or "including" a component, it does not preclude other components, but may further include other components unless the context clearly indicates otherwise.

FIG. 4 is a schematic block diagram illustrating an apparatus for training a deep neural network according to an embodiment of the present invention. Referring to FIG. 4, an apparatus 100 for training a deep neural network (DNN), which includes N layers, each composed of multiple neurons, according to the present invention (hereinafter also referred to as a "deep neural network training apparatus 100") includes an error propagation processing unit (i.e., an error propagation core) 110, a weight gradient update processing unit (i.e., weight gradient update cores) 120, and a feed-forward processing unit (i.e., feed-forward cores) 130.

The error propagation processing unit (error propagation core) 110 takes charge of error propagation. In particular, when training of a deep neural network is initiated and an error occurs in an N-th layer, which is the last layer, the error propagation processing unit 110 determines an error propagation value for an arbitrary layer based on the error and directly propagates the determined error propagation value to the arbitrary layer. That is, unlike a conventional scheme (e.g., a back-propagation (BP) algorithm), the error propagation processing unit 110 may directly propagate the error to the arbitrary layer, without sequentially propagating the error from the last layer to previous layers. For this, the error propagation processing unit 110 must have information enabling a target layer to be identified (a so-called "backward weight B"). The backward weight B is characterized in that it may be an arbitrary fixed value, without needing to be updated each time. Therefore, the error propagation processing unit 110 includes a random number generator therein, and may use a random number generated by the random number generator as the backward weight B.

A schematic block of the random number generator is exemplified in FIG. 5. FIG. 5 is a schematic block diagram of a random number generator (e.g., a pseudo random number generator) for generating a backward weight B according to an embodiment of the present invention. Referring to FIG. 5, a random number generator 115 includes three XOR logic gates and three bit shifters, and is contained in the error propagation processing unit (error propagation core) 110 to generate a random number to be used as the backward weight B. First, when a random seed (i.e., an initial point for generating a random number) is input to the random number generator 115, the XOR logic gates and the bit shifters are operated to thereby generate a random number. Thereafter, the random number generator 115 receives a random number, generated thereby, as input, and then generates an arbitrary number.

As exemplified in FIG. 5, for the random seed, different random seed values are stored for respective layers in the form of a table (e.g., a backward W table) 116. Whenever propagating an error for a specific layer, the error propagation processing unit 110 reads a random seed corresponding to the specific layer from the table 116 and then generates and uses a backward weight based on the loaded random seed. For example, when it is desired to propagate an error to a layer having a layer index of '001', the error propagation processing unit 110 reads the random seed '1010 . . . 01', which is a random seed corresponding to the layer index, from the table 116, passes the random seed through the random number generator 115, and uses a random number, generated thereby, as a backward weight. Meanwhile, the error propagation processing unit 110 determines the error propagation value (i.e., an error propagation value for each layer) by multiplying the error occurring in the N-th layer by the random number generated by the random number generator 115. That is, the error propagation processing unit 110 sets the random number generated by the random number generator 115 as the backward weight B, and directly propagates the error propagation value to the corresponding layer.

In this way, the error propagation processing unit 110 may use different backward weights for respective layers because different random seeds are used for respective layers. Further, whenever the layer changes, the error propagation processing unit 110 resets the random number generator 115 and then reads a random seed corresponding to the changed layer from the table 116 and receives the random seed, thus enabling a previously used backward weight to be maintained for each layer. The reason for this is that the backward weight cannot be changed during a training process.

In this way, the error propagation processing unit 110 generates and uses backward weights through the random number generator 115 contained therein, and thus the deep neural network training apparatus 100 according to the present invention does not need to fetch backward weights from external memory any further. Therefore, in the present invention, access to the external memory is removed during the weight gradient update and feed-forward procedures, and thus the number of times the external memory is accessed (i.e., the number of external memory accesses) may be reduced by about 42.8%.

Referring back to FIG. 4, the weight gradient update processing unit (weight gradient cores) 120 updates a forward weight W for the arbitrary layer, to which the error propagation value has been transferred from the error propagation processing unit 110. For this operation, the weight gradient update processing unit 120 updates the forward weight W for the arbitrary layer based on both the error propagation value transferred to the arbitrary layer and a feed-forward (inference) value input to the corresponding layer (i.e., the arbitrary layer). For example, the weight gradient update processing unit 120 may update the forward weight W for the arbitrary layer by performing a convolution operation on the feed-forward value input to the arbitrary layer and the error propagation value.

Generally, a back-propagation (BP) method calculates the gradient of a loss function for an input value of each neuron while an error gradient is transferred from an output layer to an input layer, and updates a weight using the computed gradient. Therefore, the weight gradient update processing unit (weight gradient cores) 120 may generate a gradient based on the error propagation value (i.e., gradient generate: GG), and may update the weight in consideration of the gradient (i.e., weight update: WU). Therefore, the weight gradient update processing unit 120 may have a GG function and a WU function. In examples of FIG. 4 and subsequent drawings (FIGS. 6A to 6C to FIGS. 8A and 8B), illustration of the WU function will be omitted for convenience of description.

The feed-forward processing unit (feed-forward cores) 130 performs inference (i.e., a feed-forward procedure) in the arbitrary layer. That is, when the update of the forward weight W is completed by the weight gradient update processing unit 120, the feed-forward processing unit 130 performs the feed-forward operation in the arbitrary layer using the forward weight W.

Here, the error propagation processing unit 110, the weight gradient update processing unit 120, and the feed-forward processing unit 130 may overlap each other to operate in parallel with each other in units of a predetermined processing time. For this operation, the deep neural network training apparatus 100 is configured such that each of the error propagation processing unit 110, the weight gradient update processing unit 120, and the feed-forward processing unit 130 has a pipelined structure. Further, the error propagation processing unit (error propagation core) 110, the weight gradient update processing unit (WG cores or GG cores) 120, and the feed-forward processing unit (feed-forward cores) 130 are implemented in a heterogeneous core architecture so as to be independently operable and controllable in the deep neural network training apparatus 100.

For example, in the deep neural network training apparatus 100, the error propagation processing unit 110, the weight gradient update processing unit 120, and the feed-forward processing unit 130, which are configured in a heterogeneous core architecture and implemented in a pipelined structure to enable parallel processing therebetween, may overlap each other to operate in parallel with each other in units of time corresponding to any one of a 'time during which individual layers constituting the deep neural network are processed', a 'time during which individual neurons constituting each layer are processed', a 'time that is required in order to update one forward weight' and 'time that is required in order to perform some of computations required in order to update one forward weight'.

Here, when the error propagation processing unit 110, the weight gradient update processing unit 120, and the feed-forward processing unit 130 overlap each other to operate in parallel with each other in units of the 'time during which individual layers constituting the deep neural network are processed', the error propagation processing unit 110, the weight gradient update processing unit 120, and the feed-forward processing unit 130 may operate in parallel with each other in different layers.

Also, when the error propagation processing unit 110, the weight gradient update processing unit 120, and the feed-forward processing unit 130 overlap each other to operate in parallel with each other in units of the 'time during which individual neurons constituting each layer are processed', the error propagation processing unit 110, the weight gradient update processing unit 120, and the feed-forward processing unit 130 may operate in parallel with each other in different neurons in the same layer.

Finally, when the error propagation processing unit 110, the weight gradient update processing unit 120, and the feed-forward processing unit 130 overlap each other to operate in parallel with each other in units of any one of the 'time that is required in order to update one forward weight' and the 'time that is required in order to perform some of computations required in order to update one forward weight', the error propagation processing unit 110, the weight gradient update processing unit 120, and the feed-forward processing unit 130 may operate in parallel with each other in the same neuron.

FIGS. 6A to 6C are diagrams illustrating examples of operation of an apparatus for training a deep neural network according to an embodiment of the present invention. Referring to FIGS. 6A to 6C, examples are illustrated in which an error propagation processing unit 110, a weight gradient update processing unit 120, and a feed-forward processing unit 130 are implemented in a heterogeneous learning core architecture and operate in parallel with each other. FIG. 6A exemplifies a computation processing procedure $$\left(\delta_i = \sum_{Ch\ Out} \delta_{i+1} * W_i^T\right)$$

by a core (i.e., an EP core) forming the error propagation (EP) processing unit 110, FIG. 6B exemplifies a computation processing procedure $$\left(\Delta W_i = \sum_{Batch} X_i * \delta_{i+1}\right)$$

by cores (i.e., GG cores) forming the weight gradient update processing unit 120, and FIG. 6C exemplifies a computation processing procedure $$\left(X_{i+1} = \sum_{Ch\ In} X_i * W_i\right)$$

by cores (i.e., FF Cores) forming the feed-forward processing unit 130.

Referring to FIG. 6A to 6C, respective cores are configured as different cores optimized for three types of training procedures, that is, error propagation (EP), weight gradient update (WG or GG), and feed-forward (FF), data paths to be supported by the respective cores are simplified, and required calculators are optimized, as exemplified in the drawings, and thus they are characterized in that area and energy efficiency is higher than that of a homogenous core architecture (see FIG. 3).

Figure 7B:
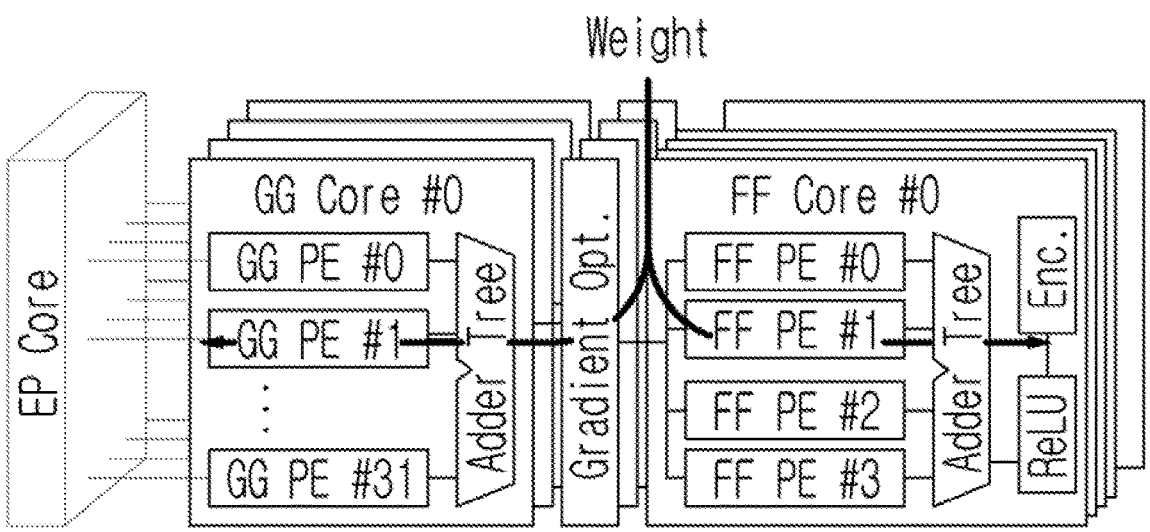

FIGS. 7A and 7B are diagrams for explaining the cause of an increase in energy efficiency of an apparatus for training a deep neural network according to an embodiment of the present invention. FIG. 7A exemplifies a conventional operation in which a weight fetched from memory is used only for a feed-forward computation, and FIG. 7B exemplifies operation of the present invention in which a weight fetched from a memory is used both for feed-forward computation and for weight gradient update computation. Referring to FIG. 7B, in the deep neural network training apparatus according to the present invention, implemented using a heterogeneous learning core architecture, respective training procedures may be processed in parallel with each other, and thus the weight fetched from the memory may be used both for the feed-forward computation and the weight gradient update computation. Therefore, the deep neural network training apparatus according to the present invention may double data reusability, thus increasing energy efficiency to that extent. Finally, the deep neural network training apparatus according to the present invention, which has the heterogeneous core architecture optimized for three training processes and doubled data reusability, exhibits area efficiency higher than that of a conventional training processor by 84.3% and energy efficiency higher than that of the conventional training processor by 58.5%.

FIGS. 8A and 8B are diagrams illustrating access to external terminal memory by a deep-neural network training apparatus according to an embodiment of the present invention. In detail, FIG. 8A schematizes and illustrates an example in which forward weights $W_1$, $W_2$, and $W_3$ and backward weights $B_1$ and $B_2$ are used for respective layers when the deep-neural network is trained according to an embodiment of the present invention. FIG. 8B schematizes and illustrates a process in which the forward weights $W_1$, $W_2$, and $W_3$ and the backward weights $B_1$ and $B_2$ are fetched from external memory. Referring to FIGS. 8A and 8B, the forward weights are used in a feed-forward procedure, and the backward weights are used in an error propagation (EP) procedure. Meanwhile, the deep-neural network training apparatus according to an embodiment of the present invention configures the error propagation (EP) procedure, a weight gradient update (WG) procedure, and the feed-forward (FF) procedure in a pipelined structure, and process the procedures in parallel with each other. Therefore, the deep-neural network training apparatus according to the present invention must fetch forward weights and backward weights in the same time band. If multiple weights must be fetched from external memory in the same time band in this way, a problem may arise in that a large memory bandwidth is required during the training of a fully connected layer or a recurrent neural network and in that a low learning speed is exhibited in a limited memory bandwidth while high power consumption occurs. However, the deep-neural network training apparatus according to the present invention is configured such that the random number generator 115, such as that exemplified in FIG. 5, is contained in the error propagation processing unit (e.g., '110' of FIG. 4), and a random number generated by the random number generator 115 is used as a backward weight, and thus there is no need to fetch the backward weight from the external memory. Therefore, the above-described problems may be solved.

FIG. 9 is a processing flowchart of a method for training a deep-neural network (hereinafter also referred to as a "deep neural network training method") according to an embodiment of the present invention. Referring to FIGS. 4 and 9, the deep neural network training method according to the embodiment of the present invention is performed as follows. That is, in the method for training a deep-neural network including N layers, each composed of multiple neurons, when the training of the deep-neural network is initiated and the occurrence of an error in an N-th layer is determined at step S110, the error propagation processing unit 110 directly propagates an error propagation value to an arbitrary layer at step S120. For this, at step S120, the error propagation value for the arbitrary layer is determined based on the error occurring in the N-th layer, after which the error propagation value is directly propagated to the arbitrary layer.

Meanwhile, in order to directly propagate the error propagation value to the arbitrary layer, information (a so-called "backward weight B") that enables a target layer to be identified must be present at step S120. Here, the backward weight B is characterized in that it may be an arbitrary fixed value, and it is not necessary to update the backward weight each time. Therefore, step S120 may further include the step of generating a random number using the error propagation processing unit 110 itself, and the random number generated at the random number generation step may be used as the backward weight B. That is, at step S120, the error propagation processing unit 110 determines an error propagation value for each layer by multiplying the error occurring in the N-th layer by the random number generated at the random number generation step. Thereafter, the error propagation processing unit 110 may set the random number generated at the random number generation step as the backward weight B, and may then directly propagate the error propagation value to the corresponding layer. For this operation, the random number generation step may further include the step of setting different random seeds for respective N layers and storing the random seeds in the form of a table (e.g., '116' of FIG. 5), and may generate a random number based on a random seed corresponding to an arbitrary layer whenever an error for the arbitrary layer is propagated.

At step S130, in response to the transfer of the error propagation value, the weight gradient update processing unit 120 updates a forward weight W for the arbitrary layer. That is, at step S130, the forward weight W for the arbitrary layer is updated based on both the error propagation value for the corresponding layer (i.e., the arbitrary layer) determined at step S120 and a feed-forward value input to the arbitrary layer. For example, at step S130, the forward weight W for the arbitrary layer may be updated by performing convolution on the feed-forward value input to the arbitrary layer and the error propagation value determined at step S120.

At step S140, the feed-forward processing unit 130 performs a feed-forward procedure in the arbitrary layer. That is, when the update of the forward weight W is completed at step S130, the feed-forward procedure in the arbitrary layer is performed using the forward weight W at step S140.

Here, a series of steps S120 to S140 may overlap each other to be performed in parallel with each other (parallel processing) in units of a processing time.

Meanwhile, when the deep neural network is trained using the deep neural network training apparatus and method according to the present invention and it is desired to initiate training from a first layer, the error propagation processing unit 110 determines an error propagation value for the first layer (i.e., a first error propagation value) based on the error occurring in the N-th layer, and then directly propagates the first error propagation value to the first layer at step S120. Further, at step S130, the weight gradient update processing unit 120 may update a forward weight $W_1$ for the first layer based on both the feed-forward value input to the first layer and the first error propagation value in response to the transfer of the first error propagation value. At step S140, when the update of the forward weight $W_1$ is completed, the feed-forward processing unit 130 performs a feed-forward procedure on a new input value in the first layer using the forward weight $W_1$.

Since the series of processing procedures (steps S120 to S140) may be performed in parallel with each other, step S120 may be performed in parallel with step S130 while, at step S130, the weight gradient update processing unit 120 updates the forward weight $W_1$ for the first layer. That is, while the weight gradient update processing unit 120 updates the forward weight $W_1$ for the first layer at step S130, the error propagation processing unit 110 may perform operation of determining an error propagation value for a second layer (i.e., a second error propagation value) based on the error occurring in the N-th layer and then directly propagating the second error propagation value to the second layer at step S120 in parallel with step S130.

Further, while the feed-forward processing unit 130 performs the feed-forward procedure in the first layer at step S140, the error propagation processing unit 110 may perform operation of determining an error propagation value for a third layer (i.e., a third error propagation value) based on the error occurring in the N-th layer, and then directly propagating the third error propagation value to the third layer at step S120 in parallel with step S140. Furthermore, at step S130, the weight gradient update processing unit 120 may process operation of updating a forward weight $W_2$ for the second layer using both a feed-forward value input to the second layer and the second error propagation value in response to the transfer of the second error propagation value in parallel with step S140.

FIG. 10 is a diagram for explaining a comparison between the deep neural network training method according to the embodiment of the present invention and a conventional method, wherein (a) in FIG. 10 illustrates an example of a conventional deep neural network training method (i.e., a back-propagation (BP) method) and (b) in FIG. 10 illustrates an example of the deep neural network training method (i.e., pipelined direct feedback alignment (PDFA)) according to an embodiment of the present invention. Referring to (a) in FIG. 10, in the conventional method, until an error value occurring in the last layer is transferred to a first layer after passing through all layers from the last layer (A), other operations (e.g., feed-forward, weight gradient update, or the like) cannot be performed. However, referring to (b) in FIG. 10, the deep neural network training method according to an embodiment of the present invention (i.e., pipelined direct feedback alignment (PDFA)) performs the error propagation procedure (AA) of propagating an error propagation value from the last layer to a second layer, and thereafter immediately performs a weight gradient update procedure (BB) using the error propagation value, without waiting for a subsequent error propagation procedure. Meanwhile, when the update of a weight gradient is completed during the weight gradient update procedure (BB), a feed-forward procedure (CC) using the updated weight gradient is immediately performed, without waiting for the weight gradient update in a subsequent layer. The reason for this is that respective processing steps (i.e., steps S120 to S140) of the present invention, such as those exemplified in FIG. 9, may overlap each other in units of a predetermined processing time to enable parallel processing.

FIG. 11 is a diagram illustrating a comparison between a training time required by the method for training a deep neural network according to the embodiment of the present invention and a training time required by the conventional method, and shows an example in which a deep neural network composed of three layers is trained. In detail, (a) in FIG. 11 illustrates a training time required by an example of a conventional deep neural network training method (e.g., back propagation (BP)), and (b) in FIG. 11 illustrates a training time required by a deep neural network training method (i.e., pipelined direct feedback alignment (PDFA)) according to an embodiment of the present invention. In the example of FIG. 11, portions indicated by single-diagonal lines represent an error propagation procedure, dotted portions represent a weight gradient update procedure, portions indicated by double-diagonal lines represent an inference (feed-forward) procedure, and the vertical axis represents a processing time.

Referring to (a) in FIG. 11, it can be seen that the conventional method proceeds to a subsequent training procedure after the processing of all layers constituting the deep neural network has been terminated for each training procedure. For example, in the conventional method, a weight gradient update procedure, which is a subsequent processing procedure, is performed after the error propagation procedure (indicated by single-diagonal lines) in all layers has been terminated, a feed-forward procedure, which is a subsequent processing procedure, is performed after the weight gradient update procedure (indicated by a dotted line) in all layers has been terminated, and the error propagation procedure is performed again after the feed-forward procedure (indicated by double-diagonal lines) in all layers has been terminated.

Referring to (b) in FIG. 11, in the case of the method according to the embodiment of the present invention, it can be seen that, when, for each of layers constituting the deep neural network in each training procedure, a training procedure in one layer is terminated, the process proceeds to a subsequent training procedure, and multiple training procedures are processed in parallel. For example, in the method according to the embodiment of the present invention, when an error propagation procedure in one of three layers constituting the deep neural network has been terminated and an error propagation procedure in a second layer is performed, a weight gradient update procedure in the first layer is performed in parallel with the error propagation procedure. Also, when the error propagation procedure in the second layer and the weight gradient update procedure in the first layer have been terminated, and an error propagation procedure in a third layer and a weight gradient update procedure in the second layer are performed in parallel, a feed-forward procedure in the first layer may be performed in parallel with the procedures. That is, at the time point at which the error propagation procedure in the first layer is performed, only the error propagation procedure is performed. However, at the time point at which the error propagation procedure in the second layer is performed, the error propagation procedure and the weight gradient update procedure in the first layer are performed in parallel. Also, at the time point at which the error propagation procedure in the third layer is performed, all of the error propagation procedure, the weight gradient update procedure in the second layer, and the feed-forward procedure in the first layer may be performed in parallel with each other.

Therefore, in this case, as illustrated in the drawings, a learning speed may be increased, thereby reducing the training time by a predetermined time D1. However, this method is characterized in that, in the case where parallel processing is performed on a per-layer basis, the effect of increasing the learning speed is further increased when the number of layers is larger, whereas the effect is slight when the number of layers is smaller.

In the examples of FIGS. 10 and 11, the case where a series of steps S120 to S140 overlap each other to be performed in parallel in units of a 'time during which individual layers constituting the deep neural network are processed' is described by way of example.

However, the present invention is not limited to the case where the processing steps (steps S120 to S140) of the present invention, such as those exemplified in FIG. 9, overlap each other to be performed in parallel with each other in units of a 'time during which individual layers constituting the deep neural network are processed'. For example, the series of steps (steps S120 to S140) may overlap each other to be performed in parallel with each other not only in units of a 'time during which individual layers constituting the deep neural network are processed' but also in any one of a 'time during which individual neurons constituting each layer are processed', a 'time required in order to update one forward weight' and a 'time required in order to perform some of operations (computations) required in order to update one forward weight'.

FIGS. 12 and 13 are diagrams illustrating comparisons between the foregoing cases.

FIG. 12 is a diagram illustrating comparisons between deep neural network training methods according to other embodiments of the present invention. In detail, (a) in FIG. 12 exemplifies the case (layer-level pipeline) where the processing steps (steps S120 to S140), such as those exemplified in FIG. 9, overlap each other to be performed in parallel with each other in units of the 'time during which individual layers constituting the deep neural network are processed'. (b) in FIG. 12 exemplifies the case (neuron-level pipeline) where the series of processing steps (steps S120 to S140) overlap each other to be performed in parallel with each other in units of the 'time during which individual neurons constituting each layer are processed'. (c) in FIG. 12 exemplifies the case (partial-sum level pipeline) where the series of processing steps (steps S120 to S140) overlap each other to be performed in parallel with each other in units of the 'time required in order to perform some of computations required in order to update one forward weight'.

In the example of FIG. 12, gray bars indicate respective layers, small circles indicated by single-diagonal lines, dotted lines, and double-diagonal lines represent neurons constituting each layer, and three-stage tables are marks indicating times required for weight gradient update. Also, single-diagonal lines indicate an error propagation processing procedure, dots indicate a weight gradient update processing procedure, and double-diagonal lines indicate an inference (feed-forward) processing procedure.

FIG. 13 is a diagram illustrating comparisons between the training times by deep neural network training methods according to embodiments of the present invention, and show an example of the case where a deep neural network composed of three layers is trained. In detail, (a) in FIG. 13 schematizes and illustrates the training time required in the case (layer-level pipeline) where the processing steps (steps S120 to S140) of the present invention, such as those exemplified in FIG. 9, overlap each other to be performed in parallel with each other in units of a 'time during which individual layers constituting the deep neural network are processed'. (b) in FIG. 13 schematizes and illustrates the training time required in the case (neuron-level pipeline) where the series of processing steps (steps S120 to S140) overlap each other to be performed in parallel with each other in units of the 'time during which individual neurons constituting each layer are processed'. (c) in FIG. 13 schematizes and illustrates the training time required in the case (partial-sum level pipeline) where the series of processing steps (steps S120 to S140) overlap each other to be performed in parallel with each other in units of the 'time required in order to perform some of computations required in order to update one forward weight'. Meanwhile, in the example of FIG. 13, portions indicated by single-diagonal lines represent an error propagation procedure, dotted portions represent a weight gradient update procedure, portions indicated by double-diagonal lines represent an inference (feed-forward) procedure, and the vertical axis represents a processing time.

Referring to (a) in FIG. 12 and (a) in FIG. 13, the series of processing steps (steps S120 to S140) may be performed in parallel with each other in different layers. Referring to (b) in FIG. 12 and (b) in FIG. 13, the series of processing steps (steps S120 to S140) may be performed in parallel with each other in different neurons in the same layer. Referring to (c)

in FIG. 12 and (c) in FIG. 13, the series of processing steps (steps S120 to S140) may be performed in parallel with each other in the same neuron.

Further, referring to FIGS. 12 and 13, it can be seen that, among the three types of pipelined structures exemplified in FIGS. 12 and 13, the structure exemplified in (c) in FIG. 12 and (c) in FIG. 13 (i.e., a partial-sum level pipeline) exhibits the highest training efficiency, and the structure exemplified in (b) in FIG. 12 and (b) in FIG. 13 (i.e., a neuron level pipeline) exhibits the next highest training efficiency.

When the structure exemplified in (c) in FIG. 12 and (c) in FIG. 13 (i.e., the partial-sum level pipeline) is adopted, there are characteristics in that pipeline utilization may be maintained at 86.4% or higher, a training time required for three fully connected layers may be reduced by an average of 55% compared to back propagation, and a neural network may be trained in real time.

Within the range guaranteeing a minimum time required for weight gradient update in this way, training efficiency may be further improved as the pipeline is configured to be divided into smaller structures.

The apparatus and method for training a deep neural network according to the present invention may reduce power consumption and improve a learning speed during the training of the deep neural network by reducing the number of external memory accesses using a random number generator (e.g., a pseudo random number generator). Accordingly, the present invention is advantageous in that it enables on-chip learning and real-time retraining and is also operable in a mobile device. Further, the apparatus and method for training a deep neural network according to the present invention is advantageous in that power consumption is reduced and a learning speed is high by utilizing a pipelined direct feedback alignment (PDFA) algorithm which is an application of a direct feedback alignment (DFA) algorithm. Accordingly, the present invention is advantageous in that network training may be performed fast, thus allowing a DNN to be utilized in an application requiring fast retraining (e.g., an object tracking application or the like). Furthermore, the present invention is advantageous in that area and energy efficiency may be improved by utilizing a heterogeneous core architecture.

In the above-described exemplary disclosure, although methods have been described based on flowcharts including a series of steps or blocks, the present invention is not limited to the sequence of steps, and some steps may be performed in a sequence differing from that of the exemplified steps or simultaneously with other steps.

Further, those skilled in the art will appreciate that the steps in each flowchart are not exclusive, and that one or more steps may be included in or excluded from the flowchart without departing from the spirit and scope of the invention.

What is claimed is:

1. An apparatus for training a deep neural network including N layers, each having multiple neurons, the apparatus comprising:
   an error propagation processing unit configured to, when an error occurs in an N-th layer in response to initiation of training of the deep neural network, determine an error propagation value for an arbitrary layer based on the error occurring in the N-th layer and then directly propagate the error propagation value to the arbitrary layer;
   a weight gradient update processing unit configured to update a forward weight (W) for the arbitrary layer based on both a feed-forward value input to the arbitrary layer and the error propagation value in response to transfer of the error propagation value; and
   a feed-forward processing unit configured to, when update of the forward weight (W) is completed, perform a feed-forward operation in the arbitrary layer using the forward weight (W),
   wherein the apparatus is configured such that:
      each of the error propagation processing unit, the weight gradient update processing unit, and the feed-forward processing unit is implemented in a heterogeneous core architecture to be independently operable and controllable, and configured in a pipelined structure, and
      each of the error propagation processing unit, the weight gradient update processing unit, and the feed-forward processing unit is configured to overlap each other within a predetermined processing time unit and operate in parallel,
   wherein during the overlapping time, each of the error propagation processing unit, the weight gradient update processing unit, and the feed-forward processing unit is configured to operate in parallel with each other in different layers, in different neurons in the same layer, or in the same neuron.

2. The apparatus of claim 1, wherein the error propagation processing unit, the weight gradient update processing unit, and the feed-forward processing unit overlap each other to operate in parallel with each other in units of a time during which individual layers constituting the deep neural network are processed.

3. The apparatus of claim 1, wherein the error propagation processing unit, the weight gradient update processing unit, and the feed-forward processing unit overlap each other to operate in parallel with each other in units of a time during which individual neurons forming each layer are processed.

4. The apparatus of claim 1, wherein the error propagation processing unit, the weight gradient update processing unit, and the feed-forward processing unit overlap each other to operate in parallel with each other in units of a time that is required in order to update one forward weight.

5. The apparatus of claim 1, wherein the error propagation processing unit, the weight gradient update processing unit, and the feed-forward processing unit overlap each other to operate in parallel with each other in units of a time that is required in order to perform part of computations required in order to update one forward weight.

6. The apparatus of claim 1, wherein:
   the error propagation processing unit comprises a random number generator configured to generate fixed random numbers for N respective layers, and
   the error propagation processing unit determines an error propagation value for each layer by multiplying the error occurring in the N-th layer by a corresponding random number generated by the random number generator, and thereafter sets the corresponding random number generated by the random number generator as a backward weight (B) and directly propagates the error propagation value to a corresponding layer.

7. The apparatus of claim 6, wherein:
   the random number generator comprises a table in which random seeds set differently for N respective layers are stored, and
   the random number generator is configured to, whenever the error for the arbitrary layer is propagated, generate a random number based on a random seed that corresponds to the arbitrary layer and that is read from the table.

8. The apparatus of claim 1, wherein:
the error propagation processing unit is configured to, when the error occurs in the N-th layer in response to initiation of training of the deep neural network, determine an error propagation value for a first layer to be a first error propagation value based on the error occurring in the N-th layer and then directly propagate the first error propagation value to the first layer,
the weight gradient update processing unit is configured to update a forward weight ($W_1$) for the first layer based on both a feed-forward value input to the first layer and the first error propagation value in response to transfer of the first error propagation value, and
the feed-forward processing unit is configured to, when update of the forward weight ($W_1$) is completed, perform a feed-forward operation on a new input value in the first layer using the forward weight ($W_1$).

9. The apparatus of claim 8, wherein the error propagation processing unit is configured to, while the weight gradient update processing unit performs an operation of updating the forward weight ($W_1$) for the first layer, perform an operation of determining an error propagation value for a second layer to be a second error propagation value based on the error occurring in the N-th layer and then directly propagating the second error propagation value to the second layer in parallel with the update operation.

10. The apparatus of claim 9, wherein the weight gradient update processing unit is configured to, while the feed-forward processing unit performs the feed-forward operation in the first layer, perform an operation of updating a forward weight ($W_2$) for the second layer based on both a feed-forward value input to the second layer and the second error propagation value in response to transfer of the second error propagation value in parallel with the feed-forward operation.

11. The apparatus of claim 10, wherein the error propagation processing unit is configured to, while the feed-forward processing unit performs the feed-forward operation in the first layer, perform an operation of determining an error propagation value for a third layer to be a third error propagation value based on the error occurring in the N-th layer and then directly propagating the third error propagation value to the third layer in parallel with the feed-forward operation.

12. A method for training a deep neural network including N layers, each having multiple neurons, the method comprising:
performing an error propagation procedure configured to, when an error occurs in an N-th layer in response to initiation of training of the deep neural network, determine an error propagation value for an arbitrary layer based on the error occurring in the N-th layer and then directly propagate the error propagation value to the arbitrary layer;
performing a weight gradient update procedure configured to update a forward weight (W) for the arbitrary layer based on both a feed-forward value input to the arbitrary layer and the error propagation value in response to transfer of the error propagation value; and
performing a feed-forward procedure configured to, when update of the forward weight (W) is completed, perform a feed-forward operation in the arbitrary layer using the forward weight (W),
wherein each of the error propagation processing unit, the weight gradient update processing unit, and the feed-forward processing unit is implemented in a heterogeneous core architecture to be independently operable and controllable, and configured in a pipelined structure,
wherein each of the error propagation processing unit, the weight gradient update processing unit, and the feed-forward processing unit is configured to overlap each other within a predetermined processing time unit and operate in parallel,
wherein during the overlapping time, each of the error propagation processing unit, the weight gradient update processing unit, and the feed-forward processing unit is configured to operate in parallel with each other in different layers, in different neurons in the same layer, or in the same neuron.

13. The method of claim 12, wherein the error propagation procedure, the weight gradient update procedure, and the feed-forward procedure overlap each other to be performed in parallel with each other in units of a time during which individual layers constituting the deep neural network are processed.

14. The method of claim 12, wherein the error propagation procedure, the weight gradient update procedure, and the feed-forward procedure overlap each other to be performed in parallel with each other in units of a time during which individual neurons forming each layer are processed.

15. The method of claim 12, wherein the error propagation procedure, the weight gradient update procedure, and the feed-forward procedure overlap each other to be performed in parallel with each other in units of a time that is required in order to update one forward weight.

16. The method of claim 12, wherein the error propagation procedure, the weight gradient update procedure, and the feed-forward procedure overlap each other to be performed in parallel with each other in units of a time that is required in order to perform part of computations required in order to update one forward weight.

17. The method of claim 12, wherein:
the error propagation procedure comprises a random number generation procedure of generating fixed random numbers for N respective layers, and
the error propagation procedure is configured to determine an error propagation value for each layer by multiplying the error occurring in the N-th layer by a corresponding random number generated in the random number generation procedure, and thereafter set the corresponding random number generated in the random number generation procedure as a backward weight (B) and directly propagate the error propagation value to a corresponding layer.

18. The method of claim 17, wherein:
the random number generation procedure comprises a random seed storage procedure of differently setting random seeds for N respective layers and storing the random seeds in a form of a table, and
the random number generation procedure is configured to, whenever the error for the arbitrary layer is propagated, generate a random number based on a random seed corresponding to the arbitrary layer.

19. The method of claim 12, wherein:
the error propagation procedure is configured to, when the error occurs in the N-th layer in response to initiation of training of the deep neural network, determine an error propagation value for a first layer to be a first error propagation value based on the error occurring in the N-th layer and then directly propagate the first error propagation value to the first layer, the weight gradient update procedure is configured to update a forward weight ($W_1$) for the first layer based on both a feed-forward value input to the first layer and the first error propagation value in response to transfer of the first error propagation value, and the feed-forward procedure is configured to, when update of the forward weight ($W_1$) is completed, perform a feed-forward operation on a new input value in the first layer using the forward weight ($W_1$).

20. The method of claim 19, wherein the error propagation procedure is configured to, while an operation of updating the forward weight ($W_1$) for the first layer is performed in the weight gradient update procedure, perform an operation of determining an error propagation value for a second layer to be a second error propagation value based on the error occurring in the N-th layer and then directly propagating the second error propagation value to the second layer in parallel with the update operation.

21. The method of claim 20, wherein the weight gradient update procedure is configured to, while the feed-forward operation in the first layer is performed in the feed-forward procedure, perform an operation of updating a forward weight ($W_2$) for the second layer based on both a feed-forward value input to the second layer and the second error propagation value in response to transfer of the second error propagation value in parallel with the feed-forward operation.

22. The method of claim 21, wherein the error propagation procedure is configured to, while the feed-forward operation in the first layer is performed in the feed-forward procedure, perform an operation of determining an error propagation value for a third layer to be a third error propagation value based on the error occurring in the N-th layer and then directly propagating the third error propagation value to the third layer in parallel with the feed-forward operation.

* * * * *